US008155240B2

(12) United States Patent
Grosskinsky

(10) Patent No.: US 8,155,240 B2
(45) Date of Patent: Apr. 10, 2012

(54) RECEIVER CIRCUIT, APPLICATION OF A FIRST AND A SECOND PROPORTIONAL ELEMENT OF A DIGITAL PLL STRUCTURE, AND METHOD FOR RECEIVING A FREQUENCY-SHIFT KEYED SIGNAL

(75) Inventor: Ulrich Grosskinsky, Neudenau (DE)

(73) Assignee: Atmel Corporation, San Jose, CA (US)

( * ) Notice: Subject to any disclaimer, the term of this patent is extended or adjusted under 35 U.S.C. 154(b) by 674 days.

(21) Appl. No.: 12/269,839

(22) Filed: Nov. 12, 2008

(65) Prior Publication Data

US 2009/0122919 A1 May 14, 2009

Related U.S. Application Data

(60) Provisional application No. 60/987,762, filed on Nov. 13, 2007.

(30) Foreign Application Priority Data

Nov. 12, 2007 (DE) ......................... 10 2007 054 201

(51) Int. Cl.
*H03D 3/24* (2006.01)

(52) U.S. Cl. ....................................................... 375/327

(58) Field of Classification Search .................. 375/327, 375/334, 376
See application file for complete search history.

(56) References Cited

U.S. PATENT DOCUMENTS 7,397,300 B2 * 7/2008 Quinlan et al. ............... 329/300

FOREIGN PATENT DOCUMENTS

DE 696 20 351 T2 4/2002
EP 0 094 837 A2 11/1983
EP 0776 094 B1 4/2002

OTHER PUBLICATIONS

Yasunori Iwanami; "Demodulation of CPFSK and GMSK Signals using Digital Signal Processing DPLL with Sequence Estimator", IEICE Trans. Commun., vol. 84-B No. 1, pp. 26-35, Jan. 2001.
William C. Lindsey; "A Survey of Digital Phase-Locked Loops", Proceedings of the IEEE, vol. 69, No. 4, Apr. 1981, pp. 410-431.

* cited by examiner

*Primary Examiner* — David C. Payne
*Assistant Examiner* — Leon-Viet Nguyen
(74) *Attorney, Agent, or Firm* — Baker Botts L.L.P.

(57) ABSTRACT

A receiver circuit, application of a first proportional element and a second proportional element of a digital PLL structure, and method for receiving a frequency-shift keyed signal are provided. A phase signal is calculated from an in-phase signal and a quadrature signal. A feedback signal is subtracted from the phase signal to form a difference signal. An output signal is determined from the difference signal by a nonlinear transfer function. The output signal is evaluated with an evaluation circuit. A first signal and a second signal are added to form a summation signal. The first signal is produced by multiplication of the output signal or the difference signal by a first proportionality factor. The second signal is produced by multiplication of the output signal or the first signal or the difference signal by a second proportionality factor, followed by integration, and the feedback signal is produced by integration of the summation signal.

20 Claims, 2 Drawing Sheets

US 8,155,240 B2

RECEIVER CIRCUIT, APPLICATION OF A FIRST AND A SECOND PROPORTIONAL ELEMENT OF A DIGITAL PLL STRUCTURE, AND METHOD FOR RECEIVING A FREQUENCY-SHIFT KEYED SIGNAL

This nonprovisional application claims priority to German Patent Application No. DE 102007054201, which was filed in Germany on Nov. 12, 2007, and to U.S. Provisional Application No. 60/987,762, which was filed on Nov. 13, 2007, and which are both herein incorporated by reference.

BACKGROUND OF THE INVENTION

1. Field of the Invention

The present invention relates to a receiver circuit, an application of a first proportional element and second proportional element of a digital PLL structure, and a method for receiving a frequency-shift-keyed signal.

2. Description of the Background Art

Frequency shift keying (FSK) is a digital form of frequency modulation. In this process, the frequency of a periodic, in particular sinusoidal, oscillation is varied among a set of different discrete values. Each frequency value here corresponds to a specific digital level. If the digital signal is a binary signal, hence {0, 1}, then two frequency values are used. In contrast, in a ternary signal, three values—e.g., {−1, 0, 1}—are used. The spectrum of the modulated signal contains, at least in part, the frequency response of the square-wave pulse, whose bandwidth is theoretically infinite. This is also referred to as "hard FSK." However, since the spectrum is generally to be limited, the square-wave pulse is preferably "rounded off" prior to the modulation and is reshaped into a sinusoidal curve or a Gaussian curve. This results in a considerably smaller bandwidth, and is referred to as a "soft FSK." The most important parameters for frequency shift keying are the frequency shift and the modulation index. The shift specifies how much separation is present between the discrete frequency values. The modulation index is the ratio of the shift and bit rate. A frequency shift keying with a modulation index equal to 0.5 is also designated as MSK (Minimum Shift Keying). In contrast, GMSK (Gaussian Minimum Shift Keying) is an MSK method with a preceding Gaussian filter.

A PLL (phase-locked loop) is a phase-coupled closed-loop control circuit. A PLL structure can be used to demodulate frequency-modulated or phase-modulated signals.

A demodulator with a digital PLL structure is known from IEICE Trans. Commun., Vol. 84-B, No. 1, pp. 26-35, January 2001, "Demodulation of CPFSK and GMSK Signals using Digital Signal Processing DPLL with Sequence Estimator." The digital PLL used here has the inherent capability for frequency tracking and is suitable for demodulating signals with relatively large Doppler shifts, for example satellite signals. Demodulation of continuous phase frequency-shift keying (CPFSK) and demodulation of GMSK are discussed. An in-phase signal and a quadrature signal are analog-to-digital converted and serve as input signals to an arctangent circuit. Using a subtractor, an output signal of a controlled oscillator is extracted from the output signal of the arctangent circuit, wherein the controlled oscillator is made up of a proportional element and an integrator. The controlled oscillator is connected to the subtractor through a loop filter, a phase detector and a mod 2p circuit to form a digital PLL structure. The subtractor and the mod 2p circuit correspond to the phase comparator in a classical PLL (generally implemented as an XOR gate there). The input signals of the subtractor represent the phase position of the real input signal relative to the local oscillator ($f_o$) and the phase position created by the integrator. In contrast, a real VCO signal does not exist here as a sinusoidal oscillation. The mod 2p circuit could be omitted in the real circuit, since the method of counting the angle in the circuit repeats after 360°, corresponding to 2p (rad). In this regard, the overflow in subtraction is ignored.

SUMMARY OF THE INVENTION

It is therefore an object of the present invention to provide a receiver circuit for receiving a frequency-shift-keyed signal.

Accordingly, a receiver circuit with a demodulator for demodulation of a frequency-shift-keyed (FSK) signal is provided. The demodulator is preferably a digital demodulator, for example as part of a digital signal processor. The demodulator has a first transmission element, a subtractor, a second transmission element, a first proportional element, a first integrator, an adder, a second proportional element and a second integrator. In this context, a transmission element is understood to mean a unit that produces one or more output signals as a function of one or more input signals. A proportional element here is understood to mean a unit that produces at its output an input signal multiplied by a proportionality factor. In contrast, a multiplier multiplies two input signals together.

The first transmission element can have an arctangent function for converting an in-phase signal and a quadrature signal into a phase signal. In this context, an arctangent function is also understood to include any approximation. For example, the values of the arctangent function are stored in a table, and the applicable function value is read out. The phase signal can also be described as a time-dependent angle signal. In this regard, the in-phase signal and quadrature signal are each present at an input of the first transmission element, while the phase signal is produced at the output. The in-phase signal, the quadrature signal, and the phase signal here are time-dependent sampled signals.

The second transmission element can be connected to the subtractor, to at least the first proportional element and one output of the demodulator. While it is possible to connect the output of the demodulator to the input of the second transmission element, provision is preferably made for the output of the demodulator to be connected to the output of the second transmission element. The second transmission element preferably has a nonlinear transfer function. The nonlinear transfer function—for example, a sine function—is preferably continuous. Alternatively, the second transmission element can also have a linear transfer function. It is possible for the second transmission element to have a proportionality, for example with a proportionality factor of 1.

The first proportional element can be connected either to the input of the second transmission element, or preferably, however, to the output of the second transmission element. The second proportional element is preferably connected to the input or the output of the first proportional element. Alternatively, it is also possible for the second proportional element to be connected to the input of the second transmission element or the output of the second transmission element.

The first proportional element can be connected to the adder. To this end, an output of the first proportional element is preferably connected to an input of the adder. The proportional element preferably has means for shifting the bit values of its input signal, which corresponds to a multiplication by a power of two.

The first integrator can be connected to the adder and a first input of the subtractor. An integrator integrates the applied input signal with respect to time. Preferably, the output of the first integrator is connected to the first input of the subtractor, and the input of the first integrator is connected to the output of the adder. The first adder works together with the first proportional element, the second proportional element, and the second integrator, preferably functioning in a manner similar to a controlled oscillator of a classical PLL structure.

A second input of the subtractor can be connected to the output of the first transmission element. The subtractor advantageously compares the output signal of the first transmission element with the output signal of the first integrator. The subtractor of the demodulator is preferably designed to subtract the output signal of the first integrator from the output signal of the first transmission element.

The adder can be connected to the second integrator. The input of the adder is preferably connected to the output of the second integrator. The second integrator is connected to the second proportional element. In this regard, the input of the second integrator is preferably connected to the output of the second proportional element. The input of the second proportional element is preferably connected to the input of the first proportional element.

The output of the demodulator can be connected to an evaluation circuit, so that an input of the evaluation circuit is connected to the output of the second transmission element. The output of the demodulator is preferably connected to a decimation filter of the evaluation circuit. The decimation filter serves to convert from a high sample rate to a low sample rate. In this process, all signal components of the input signal to the decimation filter that are above half the output sample rate must be suppressed by the decimation filter in order to prevent aliasing.

The invention has the further object of specifying a method for reception that is improved to the greatest degree possible.

Accordingly, a method for receiving a frequency-shift keyed (FSK) signal is provided. The method is preferably carried out by means of a process in a digital signal processor. The following process steps are preferably carried out continuously.

A phase signal can be calculated from an in-phase signal and a quadrature signal. An arctangent function is preferably employed for this purpose. The arctangent function here can be implemented by a computational operation or by reading values stored in a table for associated input values. A symmetry of the arctangent function can be exploited here.

A feedback signal can be subtracted from the phase signal to form a difference signal. The feedback signal here is obtained from the difference signal through feedback by means of a PLL structure.

An output signal of the demodulator can be determined from the difference signal by means of a transfer function. The transfer function is preferably nonlinear. It is especially preferred for the transfer function to be linear in a middle range, and constant and/or decreasing in value in the ranges adjoining the middle range. A nonlinear transfer function preferably accomplishes a limiting of the output signal.

The output signal can be evaluated with an evaluation circuit to obtain the transmitted information, for example a sequence of bits. The output signal of the demodulator is preferably processed by a decimation filter for evaluation. Processing by a decimation filter converts from a high sample rate to a low sample rate. In this process, all signal components of the input signal to the decimation filter that are above half the output sample rate are suppressed by the decimation filter.

A first signal and a second signal are added to form a summation signal. The first signal can be produced by multiplying the output signal or the difference signal by a first proportionality factor. The second signal is produced by multiplication of the output signal or the first signal or the difference signal by a second proportionality factor, followed by integration.

The multiplication of the output signal or the first signal or the difference signal by the second proportionality factor and the subsequent integration of the multiplied output signal advantageously act as a proportional-integral controller. A frequency offset in the demodulation is preferably taken into account by means of the proportional-integral controller. It is also possible to expand the proportional-integral controller into a proportional-integral-differential controller by means of a differential element.

The feedback signal can be produced by integration of the summation signal. In this process, a frequency-related signal is converted into a phase-related signal by the integration, so that two phase-related signals can be subtracted from one another by the subtraction.

Although it is possible in principle to execute the steps of the method serially, for example if an arithmetic logic unit (often abbreviated as ALU) is used, provision is preferably made for the steps of the method to be executed in parallel, for example in a signal processor architecture.

The invention has the further object of specifying an application of a first proportional element and a second proportional element of a digital PLL structure.

Accordingly, an application of a first proportional element and a second proportional element of a digital PLL structure of a demodulator for establishing the output signal of a demodulation of a frequency-shift-keyed signal is provided. Integrated into the digital PLL structure is a proportional-integral controller (PI) for offset compensation of a center frequency in the digital PLL structure deviating, in particular, from 0 Hz. Here, the output signal at the output of the digital PLL structure corresponds to the angle f. The frequency f, in contrast, is calculated as $$f = \frac{1}{2\pi} \cdot \frac{\Delta\varphi}{\Delta t} \qquad (1)$$

The center frequency here is understood to mean a frequency located between two frequencies produced by frequency-shift keying.

The PLL structure can be integrated monolithically in a semiconductor chip as a digital circuit.

The further developments described below relate to the receiver circuit, and also to the application of the first proportional element and the second proportional element of the digital PLL structure, and also to the method for receiving a frequency-shift-keyed signal.

In an embodiment, the input of the second proportional element is connected to the input or the output of the first proportional element. If the input of the second proportional element is connected to the output of the first proportional element, a change in the first proportionality factor also causes a change in the signal at the output of the second proportional element. In contrast, if the input of the second proportional element is connected to the input of the first proportional element, the signal at the output of the second proportional element can be set independently of the first proportionality factor.

According to a further embodiment, provision is made that the first proportional element can be designed for alterable setting of a first proportionality factor. According to another preferred further development, provision is made that the second proportional element is designed for alterable setting of a second proportionality factor. The first and/or second proportionality factor are preferably set in steps of powers of two.

In another further embodiment, provision is made that the second transmission element can be designed for alterable setting of its transfer function. For example, it is possible to switch between two transfer functions, for example a linear transfer function and a nonlinear transfer function.

According to a further embodiment, provision is made that the decimated signal is evaluated for data output. Here, a filtering takes place as a function of the data rate. For evaluation, the signal obtained is compared to a reference value that corresponds to the center frequency—for example, zero—with appropriate coding. The resulting signal is evaluated based on times—for example, edge spacings and/or edge positions—and the desired data are decoded therefrom.

The first proportionality factor and/or the second proportionality factor are preferably set in a time-dependent manner and/or as a function of the output signal. Time-dependent setting takes place, for example, when the behavior of the transmission system and the demodulator are predeterminable in some areas for the application. In this case, the frequency shift preferably is weighted equally for both frequency shifts of the FSK. For example, a Manchester code can be used for this purpose, so that the average value at the output of the demodulator would ideally be zero in the locked-in state. For example, in a simple application with a predeterminable deviation of a maximum possible frequency offset, the first and/or second proportionality factor can be set in a time-dependent manner based on the times of the predeterminable deviation.

Alternatively or in combination, a setting as a function of the output signal of the demodulator is possible. For example, a predefined time-dependent setting can be verified by means of a measurement of the output signal and changed if necessary.

In an embodiment of the invention, the first proportionality factor and the second proportionality factor can be at least temporarily associated with one another. A table is used for the association, for example. In an advantageous manner, the first proportionality factor and the second proportionality factor depend on one another by means of a function. It is especially preferred for the second proportionality factor to be set equal to the square of the first proportionality factor at least temporarily.

In a first variant embodiment, provision is advantageously made that a first initial value of the first proportionality factor is greater than a value the first proportionality factor is later set to, in particular in a locked-in state. In a second variant embodiment that can also be used in combination, provision is advantageously made that a second initial value of the second proportionality factor is greater than a value the second proportionality factor is later set to, in particular in a locked-in state. The first proportionality factor and/or the second proportionality factor preferably decrease in steps, at least over a time range, until reaching the locked-in state. The locked-in state here is advantageously reached when the frequency offset is largely compensated. The center frequency here is in a region around 0 Hz.

According to a further development, provision is made that, for different received signals, the second initial value of the second proportionality factor is larger for a first number of sampling points per bit of a first received signal than for a second number of sampling points per bit of a second received signal, if the first number of sampling points per bit is smaller then the second number of sampling points per bit. Accordingly, the smaller the number of sampling points per bit is, the larger the initial value is for the application in question. Although the associated sample rate and the associated data rate are variable here, both are known. For example, the number of sampling points per bit can vary between 6 and 1,000 depending on the sample rate and data rate. The fewer sample points are provided per bit, the faster the locked-in state should advantageously be reached by this variant further development so as not to lose any bit information insofar as possible.

In an embodiment, provision is made that the first initial value of the first proportionality factor is 1. In another embodiment that can also be used in combination, provision is made that the second initial value of the second proportionality factor is ¾, ½, ⅜, ¼ or ⅛. In still another embodiment that can also be used in combination, provision is made that the first proportionality factor and/or the second proportionality factor is switched in steps for setting. The steps here are preferably in accordance with the function $2^{-N}$, where N=0, 1, 2, 3, 4, 5, etc. For finer stepping, $2^{-N}+2^{-N-1}$ is preferably used, where N=0, 1, 2, 3, 4, 5, etc.

The first proportionality factor and/or the second proportionality factor are preferably set to smaller values in a stepwise manner. The setting to smaller values preferably takes place until a predefinable first target value of the first proportionality factor is reached and/or until a predefinable second target value of the second proportionality factor is reached. The first target value is advantageously dependent on the measured amplitude at the output of the demodulator.

According to an embodiment, provision is made that, for different received signals of different applications, a second target value of the second proportionality factor is larger for a first ratio of data rate to sample rate for a first application than for a second ratio of data rate to sample rate for a second application, if the first ratio is larger than the second ratio. Accordingly, the target value is larger for larger values of the ratio of data rate to sample rate for the specific application.

Ideally, amplitude modulation would have no effect on the demodulation of the frequency-shift-keyed signal. However, significant amplitude variations that have a higher frequency than an amplitude modulation, caused by interference for example, do influence the signals in the control loop of the digital PLL structure. According to an advantageous further development, provision is made that the first proportionality factor is adjusted as a function of detected amplitude variations of the input signal of the demodulator. To this end, the amplitude variations of the input signal are measured. As a result of the adjustment of the first proportionality factor, the signal has a lower weighting during the amplitude variation in order to reduce the probability of demodulation errors. The evaluation circuit preferably has a low-pass-filter characteristic to filter out the amplitude variations.

According to an embodiment, an offset of the difference signal or a signal that at least temporarily correlates therewith, such as the amplitude at the output of the demodulator, for example, is determined. With an offset, the average value of the difference signal differs from zero. In this regard, the first proportionality factor is preferably set depending on the detected offset. The dependency is defined by a function or a value table for the first and/or second proportionality factor associated with the detected offset, for example.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
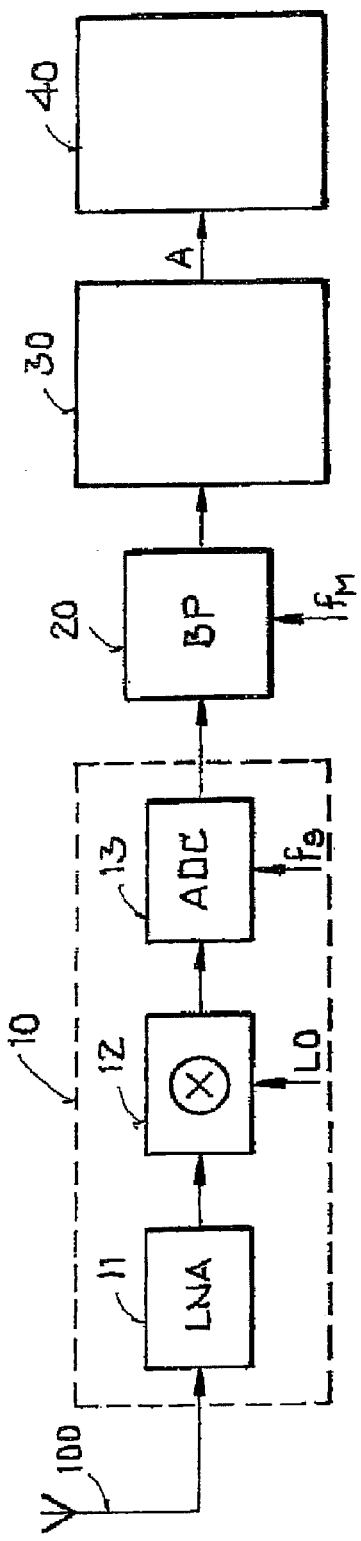
FIG. 1 is a schematic block diagram of a receiver.

FIG. 1 schematically depicts a receiver system as a block diagram. An antenna 100 is connected to a so-called front-end circuit 10 that has the analog circuits 11 and 12 and the analog-to-digital converter 13. Here, the received antenna signal is first amplified by the amplifier 11 (LNA—low noise amplifier) and delivered to the mixer 12. The amplified signal is mixed down to an intermediate frequency of, e.g., 1 MHz by means of a signal LO from a local oscillator. This mixed-down signal is than analog-to-digital converted by the analog-to-digital converter 13 using the sample frequency $f_s$. Preferably the signal LO from the local oscillator and the sample frequency $f_s$ are related to one another, for example depend on one another.

The digital signal comes from the input circuit 10 to a bandpass filter 20 whose cutoff frequencies are programmable. The adjustment of the cutoff frequencies of the bandpass filter 20 preferably takes place as a function of the selected sample frequency $f_s$. The bandpass filter 20 can also be described as an intermediate-frequency filter or channel filter. Next, the goal is to digitally mix the digital intermediate-frequency signal down to 0 Hz. This takes place, for example, in the filter 20 by means of an additional signal from a local oscillator whose frequency corresponds to the intermediate frequency. In this regard, the additional signal is preferably matched to the signal LO from the local oscillator. Thus, a digital in-phase signal I and a digital quadrature signal Q are available at the output of the bandpass filter 20.

Figure 2:
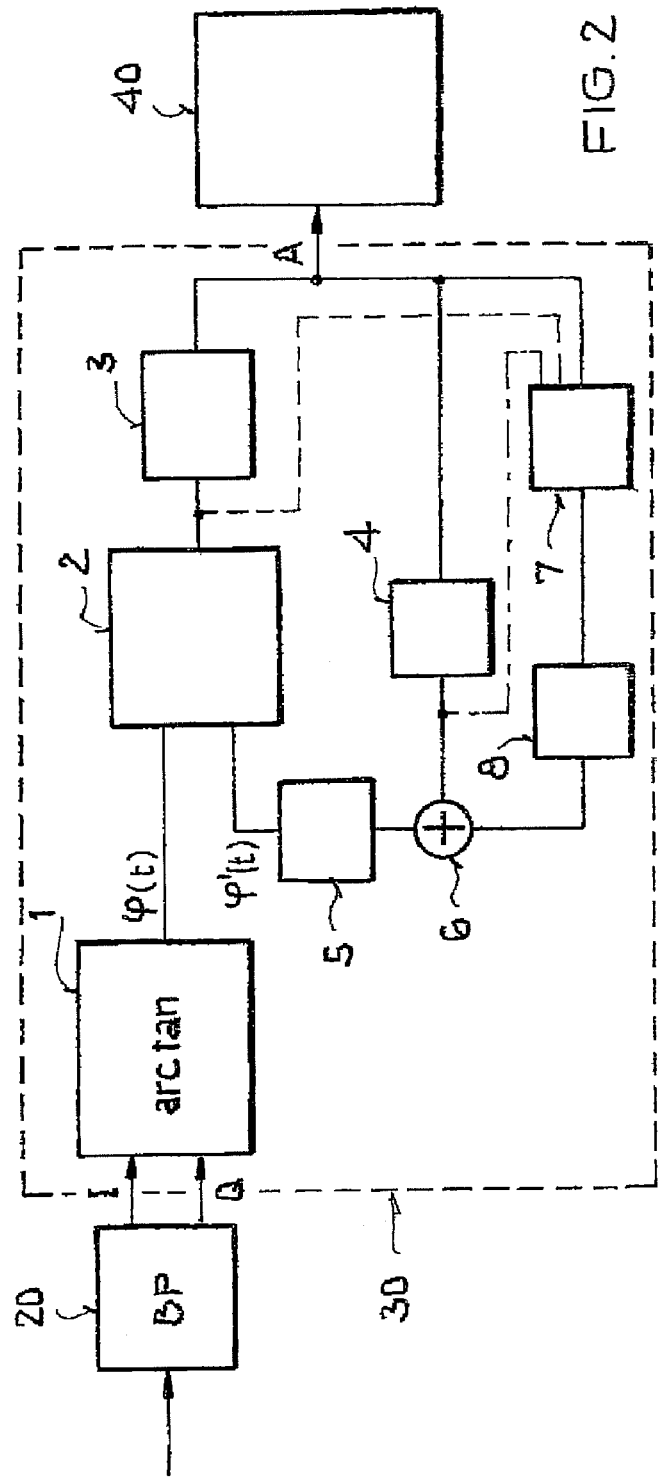
FIG. 2 is a detailed section of the schematic block diagram from FIG. 1.

The output of the bandpass filter 20 is connected to the input of a demodulator 30, which demodulates the frequency-shift-keyed signal. A demodulated signal at the output A of the demodulator 30 then arrives at an evaluation circuit 40, connected to the output A of the demodulator 30, that performs signal processing and evaluates the information in the output values of the demodulator 30. To this end, the evaluation circuit has a decimation filter that is connected to the output A of the demodulator 30. The decimated signal is evaluated to determine the transmitted data. A more detailed representation of the demodulator 30 is shown in FIG. 2.

The demodulator 30 has two inputs for the in-phase signal I and the quadrature signal Q, which are connected to the bandpass filter 20. The in-phase signal I and the quadrature signal Q arrive at a first transmission element 1 that is connected to the inputs and that has an arctangent function. Accordingly, a time-dependent phase signal f(t) is output at the output of the first transmission element 1. The time-dependent phase signal f(t) here has a value range from −p to p. The resolution of the angle is, for example, 7 bits, so that 128 values are assigned to 2p or 360°.

The time-dependent phase signal f(t) arrives at a subtractor 2 connected to the output of the first transmission element 1. The subtractor 2 compares the time-dependent phase signal f(t) to a time-dependent feedback signal f'(t) by subtracting the signals.

Figure 3:
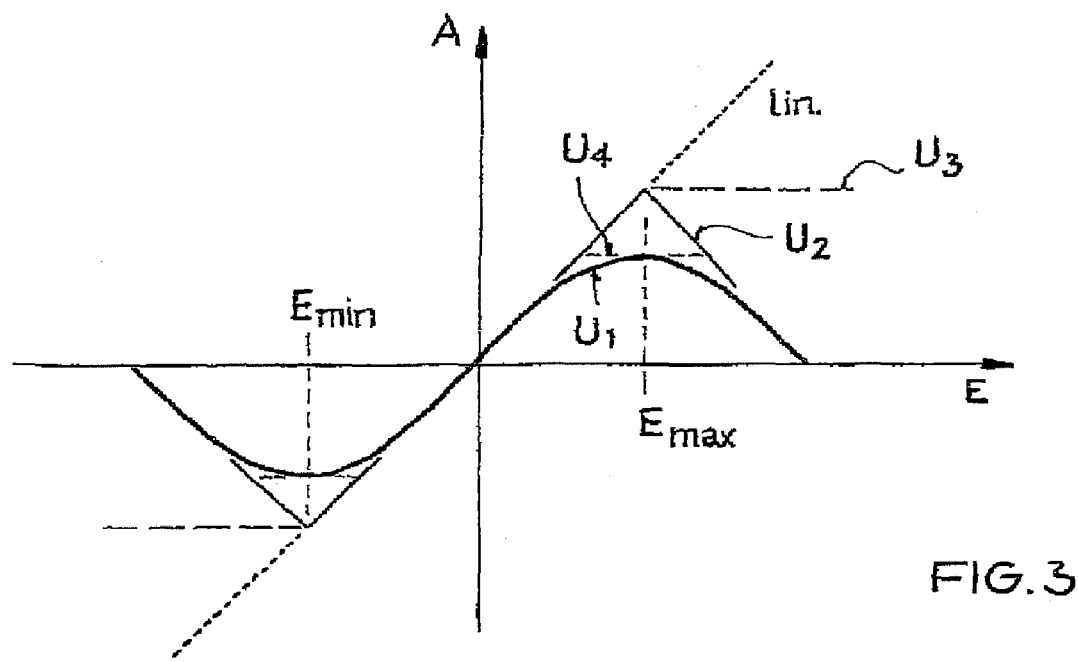
FIG. 3 illustrates transfer functions of different example embodiments.

The output of the subtractor 2 is connected to a second transmission element 3. The transfer function of the second transmission element 3 is advantageously parameterizable. In the example embodiment in FIG. 2, the second transmission element has a nonlinear transfer function. Possible transfer functions for the second transmission element 3 are shown schematically in FIG. 3 by way of example. The output value A (ordinate) of the second transmission element 3 is represented with respect to the input value E (abscissa) of the second transmission element 3 here.

All transfer functions U1, U2, U3 and U4 have an at least approximately linear transfer function in the vicinity of the input value 0. However, these functions deviate from a straight line for larger input values E. A first variant embodiment provides a sine function as the transfer function U1. In contrast, a second variant embodiment provides a function whose value decreases starting from an input value of $E_{max}$ or $E_{min}$. In a third variant embodiment, a constant output value is assigned starting from the input value of $E_{max}$ or $E_{min}$. In contrast, the fourth variant embodiment provides a function that approximates a sine function but is simpler to implement with binary logic. In the fourth variant embodiment here, a constant output value is assigned between the linear region about the input value 0 and the function whose value decreases.

As is also shown in FIG. 2, the demodulator 30 has a first proportional element 4 and a first integrator 5, which are connected to one another through an adder 6. The proportional element 4 is also connected to the second transmission element 3 and the output A of the demodulator 30.

The output of the integrator 5 outputs the time-dependent feedback signal f'(t) to one input of the subtractor 2. The loop having the subtractor 2, first transmission element 3, first proportional element 4 and first integrator 5 has approximately proportional controller characteristics with regard to the output signal at output A and the input frequency.

The time-dependent phase signal f(t) has a nominal frequency of 0 Hz in the ideal case. In this ideal case, the frequency shifting results in an alternating output of two angle values, wherein for binary data one angle value is advantageously associated with a binary one and another angle value with a binary zero. However, the available transmitters may differ from one another, or the transmission channel may change. In this case, which is nonideal but relevant in practice, a frequency offset (for example, 50 KHz) appears at the output of the first transmission element 1, which should be regulated back to nominally 0 Hz so that the frequency offset lies in a region around 0 Hz in the locked-in state. At the beginning of a receive sequence, the frequency offset, which in some cases may be considerably greater than the frequency shift of the signal to be received, should be detected and compensated.

To this end, the demodulator 30 has a second proportional element 7 and a second integrator 8, which together with the loop having the first integrator 5, subtractor 2, and second transmission element 3 act as a proportional-integral controller that regulates the frequency offset to a nominal 0 Hz. In the case of a weak received signal with a large noise component, the individual sampled values are subject to relatively large statistical variations. Therefore, they are preferably averaged.

The averaging is effected by the second integrator 8. The second proportional element 7 determines, by means of its weighting, how many sampled values are included in a first integration step. The number of sampled values here depends on the time available. Thus, a small number of sampled values per bit—e.g., 6 samples—only allows a weighting of a few sampled values. In contrast, a large number of sampled values per bit—e.g., 800 samples—allows a weighting of many sampled values. The number of sampled values per bit here is a function of the sample rate and the data rate.

The input of the second proportional element 7 here is connected to the output of the second transmission element 3, and the output of the second proportional element 7 is connected to an input of the second integrator 8, and an output of the second integrator 8 is connected to the adder 6. Alternatively, the input of the second proportional element 7 is connected to the output of the first proportional element 4 (shown in dashed-and-dotted lines in FIG. 2) or to the output of the subtractor 2 (shown in dashed lines in FIG. 2).

Preferably, the first proportional element 4 and/or the second proportional element 7 are designed to set a first proportionality factor of the first proportional element 4 and/or a second proportionality factor of the second proportional element 7. In multiple steps of setting, the first proportionality factor of the first proportional element 4 is decreased in a stepwise manner. By this means, the sensitivity of the demodulator 30 is raised and a larger signal is output at the output A of the control loop in the case of a remaining offset. The second transmission element 3 must not be overdriven in this process. The setting of the second proportionality factor of the second proportional element 7 is based on criteria of control-loop design, such as the stability and desired settling behavior—for example, a settling behavior in the manner of an asymptotic boundary condition. The target value of the first proportionality factor depends on the frequency shift of the FSK modulation relative to the sample rate. Surprisingly, it is possible in this way to achieve the result that, for a variety of conditions—in particular, different frequency shifts or different sample rates—the demodulation of the signal results in a signal amplitude at output A that lies in an amplitude range that preferably has tight tolerances. This has the surprising effect for the subsequent signal processing that a relatively rough quantization is sufficient. Alternatively, the first proportionality factor and/or the second proportionality factor can be adaptively adjusted, for example when the frequency shift is unknown on the receiving side.

Since the output A of the demodulator 30 is located after the subtractor 2 and is connected to the second transmission element 3 as shown in the example embodiment in FIG. 2, the surprising effect is achieved that the signal at output A contains no frequency offset in the locked-in state. The frequency offset is not present at output A in the locked-in state. Moreover, the adjustability of the proportionality factors of the first proportional element 4 and the second proportional element 7 achieve the effect, surprising to a practitioner of the art, that the output signal at output A is settable within wide limits by means of the settable proportionality factors.

At the start of demodulation, the frequency offset is generally unknown. However, the frequency offset is advantageously not significantly greater than half the bandwidth of the bandpass filter 20. In this unlocked state, the sensitivity of the demodulator 30 is set low by the means that the first proportionality factor of the first proportional element 4 is set to the value one. The amplification resulting from the strong feedback through the first proportional element 4 is correspondingly small. This prevents overdriving of the demodulator 30. In contrast, the proportionality factor of the second proportional element 7 is preferably set to a value smaller than one at the beginning in order to achieve compensation of the frequency offset. The proportionality factor of the second proportional element 7 is adjusted for the data rate and averaging of many samples here.

Later, in the locked-in state, when the frequency offset is largely compensated, the first proportionality factor is set through intermediate steps to a constant desired value that defines the sensitivity of the demodulator for the desired application. The first proportionality factor here is preferably dependent on a ratio of frequency shift to sample frequency. In contrast, in the locked-in state the second proportionality factor is set to a very small value, for example $1/64$, or to zero.

Figure 4:
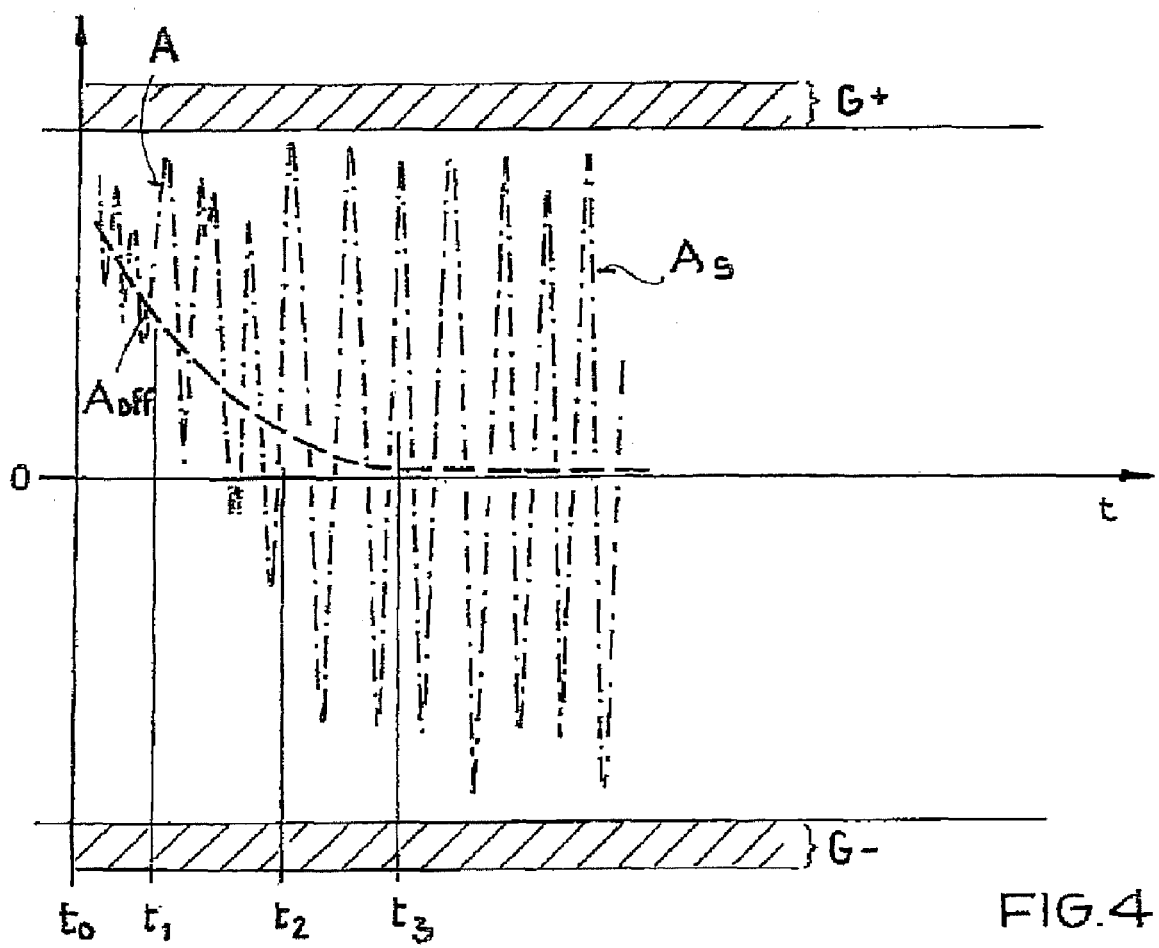
FIG. 4 is a schematic diagram of an output signal at an output of the demodulator.

FIG. 4 schematically shows a signal behavior of the output signal $A_s$ at the output A of the demodulator with respect to the time t. The output signal $A_s$ is shown in a window between two regions G+ and G−, which constitute a modulation reserve. For example, if a total value range of 128 quantization steps is used, a range of, e.g., +/−50 quantization steps is used in the window, so that the two regions G+ and G− have 14 or 13 quantization steps. At the start, at time $t_0$, the output signal $A_s$ has a maximum offset. The offset $A_{off}$ of the output signal $A_s$ is shown schematically in dashed lines in FIG. 4. In this regard, the offset is neither calculated nor output, and is shown in FIG. 4 exclusively for purposes of explanation. At time $t_1$, the first proportionality factor is halved, from the value one to the value one half. Accordingly, after a short settling delay the amplitude of the output signal $A_s$ doubles. At the time $t_2$ the offset is regulated down far enough that the first proportionality factor can be halved again, so that the amplitude is matched to the modulation window. At time $t_3$, the offset is largely regulated out, so that the offset in this locked-in state is regulated in a region about the value zero or exactly to zero.

The invention is not restricted to the variant example embodiments shown in FIGS. 1 through 4. For example, it is possible in the locked-in state to set the second proportionality factor to a value such that a small amount of readjustment is possible. It is also possible, for example, for the second transmission element 3 to have a linear transfer function, for example A=E. The functionality of the circuit shown in FIG. 2 can be used to particular advantage for a universal radio system.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A receiver circuit, which has a demodulator for demodulation of a frequency-shift-keyed signal, the demodulator comprising:
   a first transmission element that has an arctangent function for converting an in-phase signal and a quadrature signal into a phase signal;
   a subtractor having a second input connected to an output of the first transmission element;
   a second transmission element;
   a first proportional element;
   a first integrator;
   a second proportional element; and
   a second integrator connected to the second proportional element;
   an adder connected to the second integrator;

wherein the second transmission element is connected to the subtractor, to at least the first proportional element and one output of the demodulator, and has a nonlinear transfer function, wherein the first proportional element is connected to the adder, wherein the first integrator is connected to the adder and a first input of the subtractor, and wherein the output of the demodulator is connected to an evaluation circuit.

2. The receiver circuit according to claim 1, wherein the input of the second proportional element is connected to the input or the output of the first proportional element.

3. The receiver circuit according to claim 1, wherein the output of the demodulator is connected to a decimation filter of the evaluation circuit.

4. The receiver circuit according to claim 1, wherein the first proportional element is designed for alterable setting of a first proportionality factor.

5. The receiver circuit according to claim 1, wherein the second proportional element is designed for alterable setting of a second proportionality factor.

6. The receiver circuit according to claim 1, wherein the second transmission element is designed for alterable setting of the transfer function.

7. A method for receiving a frequency-shift keyed signal, the method comprising:
   calculating a phase signal from an in-phase signal and a quadrature signal;
   subtracting a feedback signal from the phase signal to form a difference signal;
   determining an output signal from the difference signal by a nonlinear transfer function;
   evaluating the output signal with an evaluation circuit; and
   adding a first signal and a second signal to form a summation signal;
   wherein the first signal is produced by multiplication of the output signal or the difference signal by a first proportionality factor,
   wherein the second signal is produced by multiplication of the output signal or the first signal or the difference signal by a second proportionality factor, followed by integration, and
   wherein the feedback signal is produced by integration of the summation signal.

8. The method according to claim 7, wherein the output signal is first processed by a decimation filter for evaluation, and then the decimated signal is evaluated for data output.

9. The method according to claim 7, wherein the first proportionality factor and/or the second proportionality factor are set in a time-dependent manner and/or as a function of the output signal.

10. The method according to claim 9, wherein the first proportionality factor and the second proportionality factor are at least temporarily associated with one another and/or depend on one another by a function, wherein, the second proportionality factor is set equal to the square of the first proportionality factor.

11. The method according to claim 9, wherein a first initial value of the first proportionality factor is greater than a value the first proportionality factor is later set to in a locked-in state, and/or wherein a second initial value of the second proportionality factor is greater than a value the second proportionality factor is later set to, in particular in a locked-in state.

12. The method according to claim 11, wherein, for different received signals, the second initial value of the second proportionality factor is larger for a first number of sampling points per bit of a first received signal than for a second number of sampling points per bit of a second received signal, if the first number of sampling points per bit is smaller then the second number of sampling points per bit.

13. The method according to claim 11, wherein the first initial value is 1 and/or wherein the second initial value is $\sqrt[3]{4}$, $\frac{1}{2}$, $\frac{3}{8}$, $\frac{1}{4}$ or $\frac{1}{8}$ and/or wherein the first proportionality factor and/or the second proportionality factor is switched in steps for setting.

14. The method according to claim 7, wherein the first proportionality factor and/or the second proportionality factor are set to smaller values in a stepwise manner, in particular until a predefinable first target value of the first proportionality factor is reached and/or until a predefinable second target value of the second proportionality factor is reached.

15. The method according to claim 7, wherein for different received signals a second target value of the second proportionality factor is larger for a first ratio of data rate to sample rate for a first received signal than for a second ratio of data rate to sample rate for a second received signal, if the first ratio is larger than the second ratio.

16. The method according to claim 7, wherein an offset of the difference signal or a signal that at least temporarily correlates therewith is determined.

17. The method according to claim 16, wherein the first proportionality factor is set depending on the detected offset.

18. A system, comprising:
   means for calculation a phase signal from an in-phase signal and a quadrature signal;
   means for subtracting a feedback signal from the phase signal to form a difference signal;
   means for determining an output signal from the difference signal by a nonlinear transfer function;
   means for evaluating the output signal with an evaluation circuit; and
   means for adding a first signal and a second signal to form a summation signal;
   wherein:
      the first signal is produced by multiplication of the output signal or the difference signal by a first proportionality factor;
      the second signal is produced by multiplication of the output signal or the first signal or the difference signal by a second proportionality factor, followed by integration; and
      the feedback signal is produced by integration of the summation signal.

19. The system according to claim 18, wherein the output signal is first processed by a decimation filter for evaluation, and then the decimated signal is evaluated for data output.

20. The system according to claim 18, wherein for different received signals a second target value of the second proportionality factor is larger for a first ratio of data rate to sample rate for a first received signal than for a second ratio of data rate to sample rate for a second received signal, if the first ratio is larger than the second ratio.

* * * * *